US012143953B2

(12) United States Patent
Pal et al.

(10) Patent No.: US 12,143,953 B2
(45) Date of Patent: Nov. 12, 2024

(54) TECHNIQUES FOR POWER REDUCTION IN SINGLE SUBSCRIBER IDENTITY MODULE (SSIM) AND MULTI-SIM (MSIM) 5G NEW RADIO (NR) STANDALONE (SA) USER EQUIPMENT (UE) DEVICES

(71) Applicant: QUALCOMM Incorporated, San Diego, CA (US)

(72) Inventors: Arnab Pal, Hyderabad (IN); Yong Li, San Diego, CA (US); Jyothi Kiran Vattikonda, San Diego, CA (US); Upamanyu Jamwal, Mandi (IN); Vishnu Namboodiri Karakkad Kesavan Namboodiri, Hyderabad (IN)

( * ) Notice: Subject to any disclaimer, the term of this patent is extended or adjusted under 35 U.S.C. 154(b) by 293 days.

(21) Appl. No.: 17/711,726

(22) Filed: Apr. 1, 2022

(65) Prior Publication Data

US 2023/0319741 A1 Oct. 5, 2023

(51) Int. Cl.
*H04W 56/00* (2009.01)
*H04L 1/16* (2023.01)
*H04L 1/1607* (2023.01)
*H04W 68/00* (2009.01)

(52) U.S. Cl.
CPC ......... *H04W 56/001* (2013.01); *H04L 1/1642* (2013.01); *H04W 68/005* (2013.01)

(58) Field of Classification Search
CPC . H04W 56/001; H04W 68/005; H04W 8/183; H04W 52/0229; H04W 48/16; H04L 1/1642; H04L 5/005
USPC ........................................................ 370/503
See application file for complete search history.

(56) References Cited

U.S. PATENT DOCUMENTS

| | | | |
|---|---|---|---|
| 2013/0176873 A1* | 7/2013 | Ji | H04W 76/28 455/67.11 |
| 2021/0329562 A1* | 10/2021 | Yu | H04W 52/028 |
| 2022/0159617 A1* | 5/2022 | Shih | H04W 76/27 |
| 2022/0210843 A1 | 6/2022 | Lee et al. | |
| 2023/0108646 A1* | 4/2023 | Tseng | H04W 68/025 455/458 |

(Continued)

FOREIGN PATENT DOCUMENTS

| | | |
|---|---|---|
| EP | 4109800 A1 | 12/2022 |
| EP | 4181582 A1 | 5/2023 |

(Continued)

OTHER PUBLICATIONS

International Search Report and Written Opinion—PCT/US2023/064263—ISA/EPO—Jun. 21, 2023.

(Continued)

*Primary Examiner* — Candal Elpenord

(57) ABSTRACT

This disclosure provides systems, methods and apparatus, including computer programs encoded on computer storage media, relating to synchronization signal block (SSB) selection for paging occasions (POs). In an example, a UE may identifying a first SSB overlapping with or after a PO. The UE may further identify that a distance between the first SSB and the PO is less than a distance between a second SSB the PO, the second SSB located before the PO. The UE may further select the first SSB associated with loop operations based on identifying that the distance between the first SSB and the PO is less than a distance between the second SSB the PO.

27 Claims, 9 Drawing Sheets

(56) References Cited

U.S. PATENT DOCUMENTS

| | | | | |
|---|---|---|---|---|
| 2023/0143475 A1* | 5/2023 | Wu | ................... | H04W 52/0274 |
| | | | | 455/458 |
| 2023/0319778 A1* | 10/2023 | Xue | ..................... | H04W 68/02 |
| | | | | 455/458 |
| 2023/0362888 A1* | 11/2023 | Zhou | ................... | H04W 56/001 |
| 2023/0397118 A1* | 12/2023 | He | ................... | H04W 52/0216 |
| 2024/0080766 A1* | 3/2024 | Zhou | ..................... | H04W 68/02 |
| 2024/0089921 A1* | 3/2024 | Ma | ........................ | H04W 68/02 |

FOREIGN PATENT DOCUMENTS

| | | | |
|---|---|---|---|
| WO | 2020226378 | A1 | 11/2020 |
| WO | 2021184200 | A1 | 9/2021 |
| WO | 2022022742 | A1 | 2/2022 |

OTHER PUBLICATIONS

Qualcomm Incorporated: "Configuration of MUSIM Gaps", 3GPP TSG-RAN WG2 Meeting #116bis-e, R2-2200489, 3rd Generation Partnership Project, Mobile Competence Centre, 650, Route Des Lucioles, F-06921 Sophia-Antipolis Cedex, France, vol. RAN WG2, No. Electronic, Jan. 17, 2022-Jan. 25, 2022, Jan. 11, 2022, XP052093652, pp. 1-4, pp. 1-2.

Qualcomm Incorporated: "Paging Enhancements for Idle/Inactive UE Power Saving", 3GPP TSG-RAN WG1 #107-e, R1-2112226, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, XP052075332, 7 pages, pp. 1-5.

* cited by examiner

TECHNIQUES FOR POWER REDUCTION IN SINGLE SUBSCRIBER IDENTITY MODULE (SSIM) AND MULTI-SIM (MSIM) 5G NEW RADIO (NR) STANDALONE (SA) USER EQUIPMENT (UE) DEVICES

TECHNICAL FIELD

Aspects of the present disclosure relate generally to wireless communication systems, and more particularly, to power reduction for single subscriber identity module (SSIM) and multi-SIM (MSIM) 5G New Radio (NR) standalone (SA) user equipment (UE) devices.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

SUMMARY

The systems, methods and devices of this disclosure each have several innovative aspects, no single one of which is solely responsible for the desirable attributes disclosed herein.

According to an example, a method of wireless communication at a user equipment (UE) is provided. The method may include identifying a first synchronization signal block (SSB) overlapping with or after a paging occasion (PO). The method may further include identifying that a distance between the first SSB and the PO is less than a distance between a second SSB the PO, the second SSB located before the PO. The method may further include selecting the first SSB associated with loop operations based on identifying that the distance between the first SSB and the PO is less than a distance between the second SSB the PO.

In a further example, an apparatus for wireless communication including a transceiver, a memory configured to store instructions, and at least one processor communicatively coupled with the transceiver and the memory, where the at least one processor may be configured to identify a first SSB overlapping with or after a PO. The at least one processor may further be configured to identify that a distance between the first SSB and the PO is less than a distance between a second SSB the PO, the second SSB located before the PO. The at least one processor may further be configured to select the first SSB associated with loop operations based on identifying that the distance between the first SSB and the PO is less than a distance between the second SSB the PO.

In a further example, an apparatus for wireless communication, includes means for identifying a first SSB overlapping with or after a PO. The apparatus may further include means for identifying that a distance between the first SSB and the PO is less than a distance between a second SSB the PO, the second SSB located before the PO. The apparatus may further include means for selecting the first SSB associated with loop operations based on identifying that the distance between the first SSB and the PO is less than a distance between the second SSB the PO.

In a further example, a non-transitory computer-readable medium including code executable by at least one processor to identifying a first SSB overlapping with or after a PO, identify that a distance between the first SSB and the PO is less than a distance between a second SSB the PO, the second SSB located before the PO, and select the first SSB associated with loop operations based on identifying that the distance between the first SSB and the PO is less than a distance between the second SSB the PO.

Details of one or more aspects of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
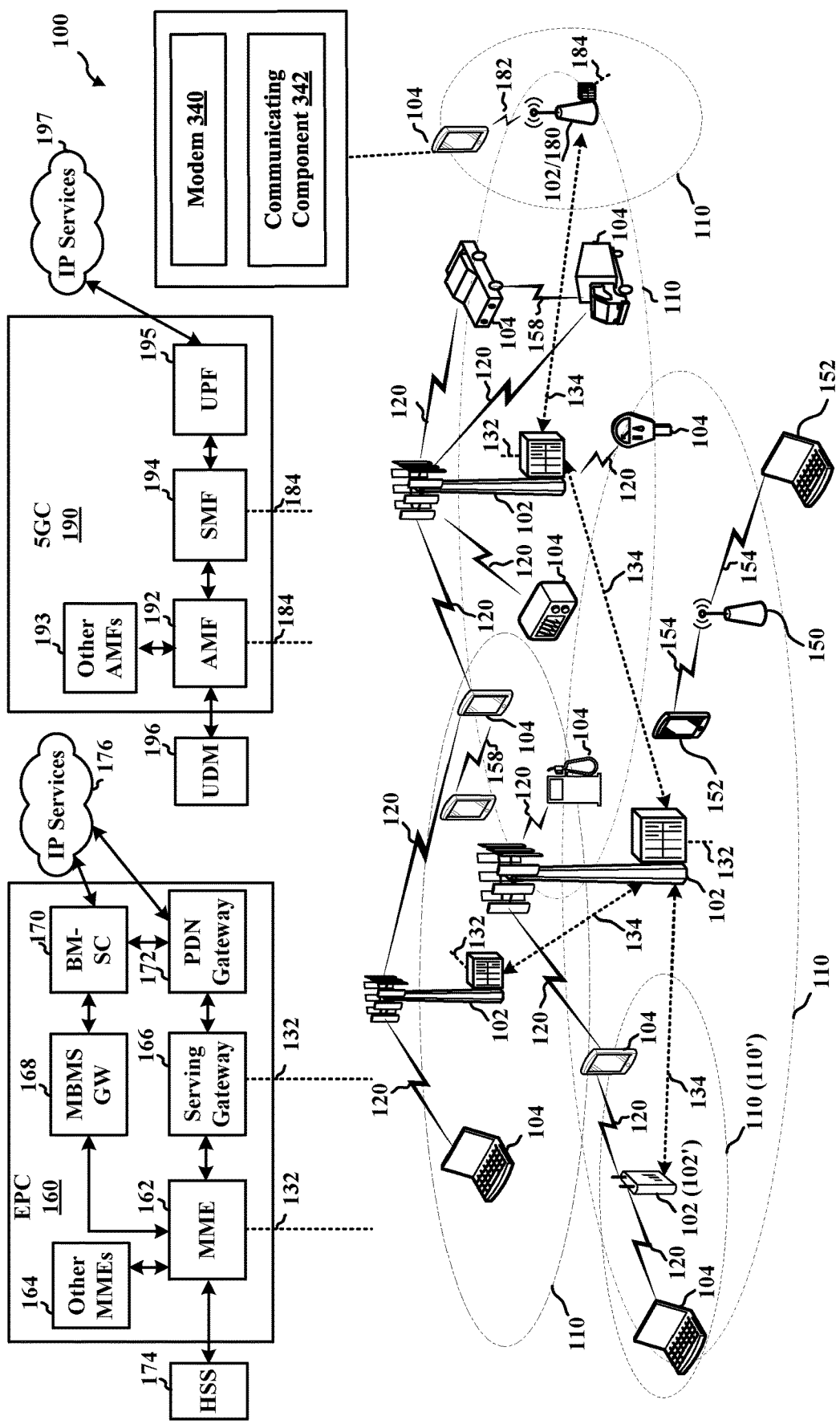
FIG. 1A illustrates an example of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects of the present disclosure generally relate to power reduction for single subscriber identity module (SSIM) and multi-SIM (MSIM) 5G New Radio (NR) standalone (SA) user equipment (UE) devices. An aspect of broadcast information in a wireless communication system may be to establish channels for communication between the UE and a network entity (i.e., gNB), which may be referred to as paging. Paging is a procedure a wireless network may use to locate a UE prior to connection establishment. For example, paging may be used to alert the UE of an incoming session. In many scenarios, paging may occur while the UE is in radio resource control (RRC) idle or standalone mode.

During that state, the UE may monitor whether the network is sending a paging message. In doing so, the UE may use limited storage energy (i.e., battery) to run the monitoring process. During idle mode, the UE may enter and remain in a sleeping state corresponding to a discontinuous reception (DRX) cycle. The UE may periodically wake up and monitor PDCCH to check for the presence of a paging message. If the PDCCH indicates that a paging message is transmitted, then the UE may demodulate the paging channel to decode the paging message.

In NR, a UE may consume a minimal amount of overall stored energy during paging reception. Nonetheless, due to the synchronization signal block (SSB) transmission scheme in NR, loop operations such automatic gain control (AGC), frequency tracking loop (FTL), timing tracking loop (TTL), and measurements can be performed in certain occasions. As a result, the gap between the SSBs for loop/measurements and paging occasions (PO) may be longer, and UE may enter a light sleep mode in the gap. In some aspects, an SSB may correspond to a synchronization signal and a physical broadcast channel (PBCH). The synchronization signal may be a primary synchronization signal (PSS) and/or a secondary synchronization signal (SSS). Specifically, an SSB may include a primary synchronization signal (PSS), a secondary synchronization signal (SSS), and a physical broadcast channel (PBCH).

Further, in 5G-NR standalone mode, efficient power consumption while maintaining good paging performance is desired. For example, the network may configure a UE with different DRX cycles (i.e. 160 ms, 320 ms, 640 ms, 1280 ms, 2560 ms) in idle mode (5G-NR). The UE may read a paging message, and before waking up for page decoding, the UE may schedule loop warmup before paging occasion. This ensures good paging decode performance as the UE can estimate/correct timing error and frequency error before decoding paging.

In current implementations for modem chipsets, the UE may wake up 20 ms (i.e., default SSBS periodicity) before a PO. This ensures good paging decode performance, yet scheduling loop warmup during sleep (e.g., DRX cycle) may adversely affect power performance. In an aspect, the UE may not be able to go to deep sleep in between, thereby degrading UE battery power performance. As the UE cannot enter into deep sleep, the power consumed by the multiple wake-up times may be significant.

Particular implementations of the subject matter described in this disclosure can be implemented to realize one or more of the following potential advantages. The disclosed techniques enable the UE to enter deep sleep between POs. Specifically, the coexistence techniques described herein may provide a flexible approach that enables a UE to decrease power consumption by scheduling SSBs closer to POs.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1A illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include or otherwise correspond to gNBs 180. Further, in some aspects, the base stations 102 may each include multiple TRPs.

In one example, some nodes such as base station (BS) 102/gNB 180, may have a modem 240 for facilitating communications, as described herein. Though a base station 102/gNB 180 is shown as having the modem 240, this is one illustrative example, and substantially any node may include a modem 240 for providing corresponding functionalities described herein.

In another example, some nodes such as UE 104 of the wireless communication system may have a modem 340 and communicating component 342 for identifying a first SSB overlapping with or after a PO, identifying that a distance between the first SSB and the PO is less than a distance between a second SSB the PO, the second SSB located before the PO, and selecting the first SSB associated with loop operations based on identifying that the distance between the first SSB and the PO is less than a distance between the second SSB the PO, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104.

The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176.

The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 4A:
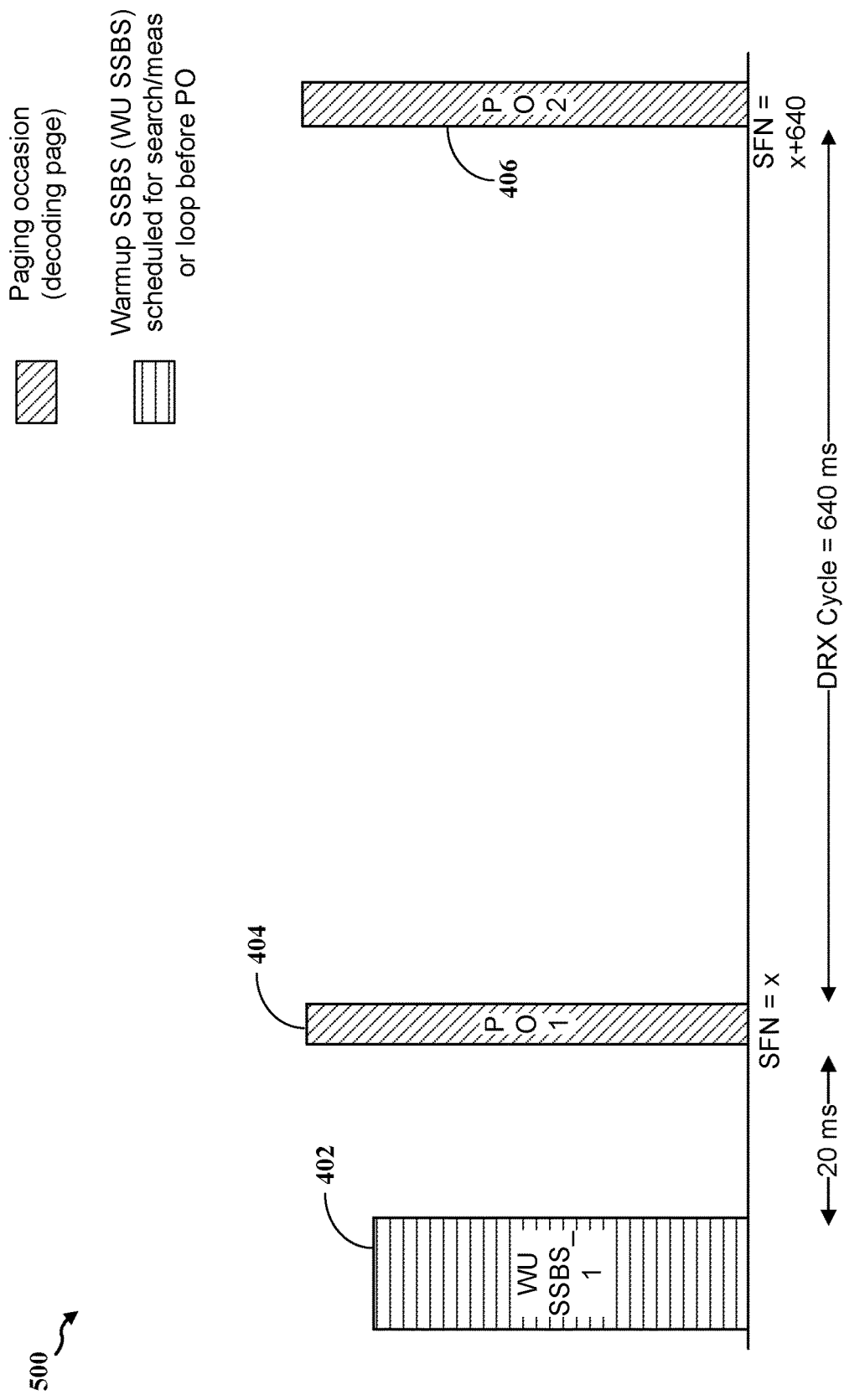
FIG. 4A illustrates an example paging communication scenario including one or more paging occasions (POs) and synchronization signal blocks (SSBs) scheduled prior to the POs.
Figure 4B:
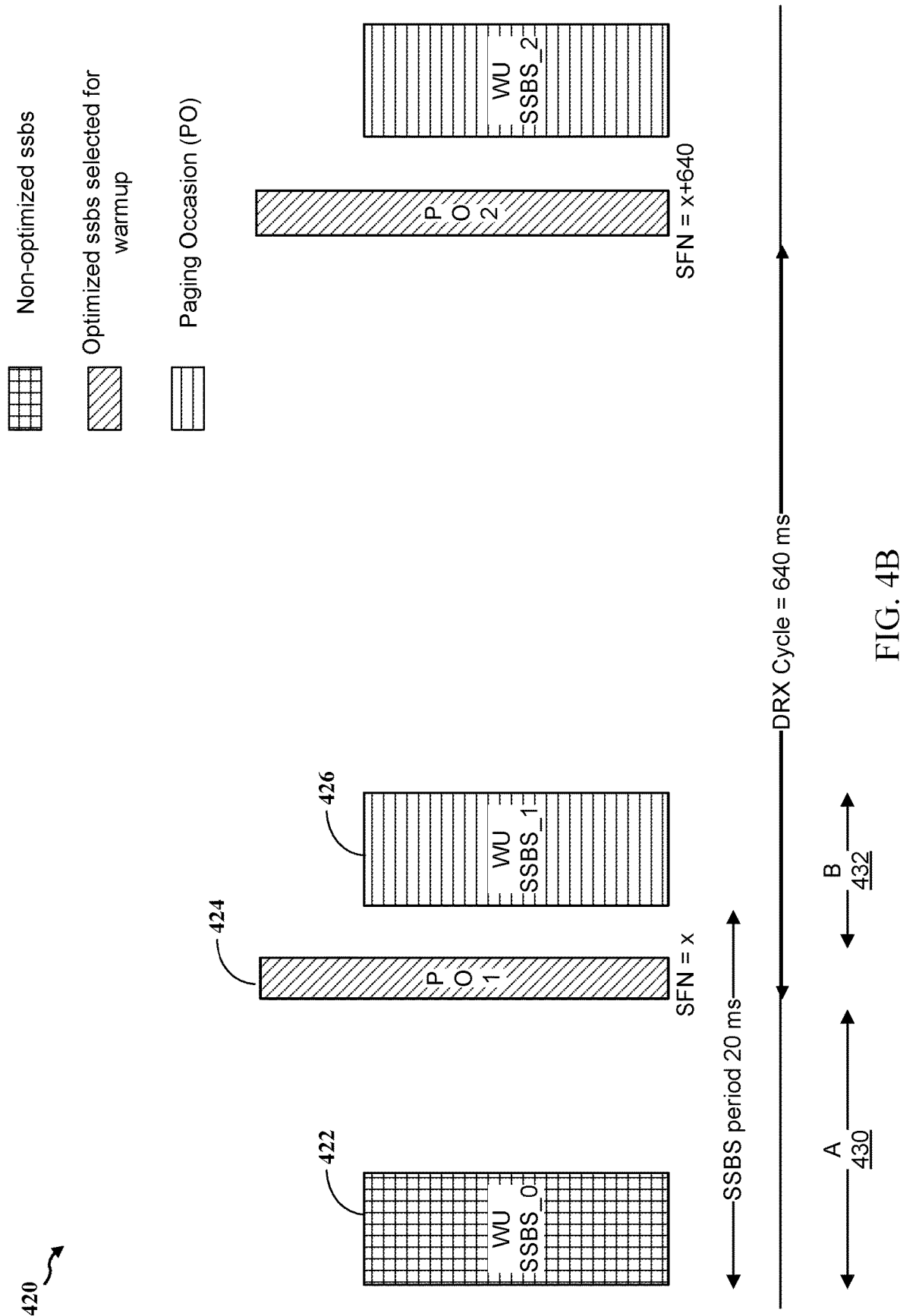
FIG. 4B illustrates another example paging communication scenario including one or more POs and SSBs overlapping with or scheduled after the POs.
Figure 5:
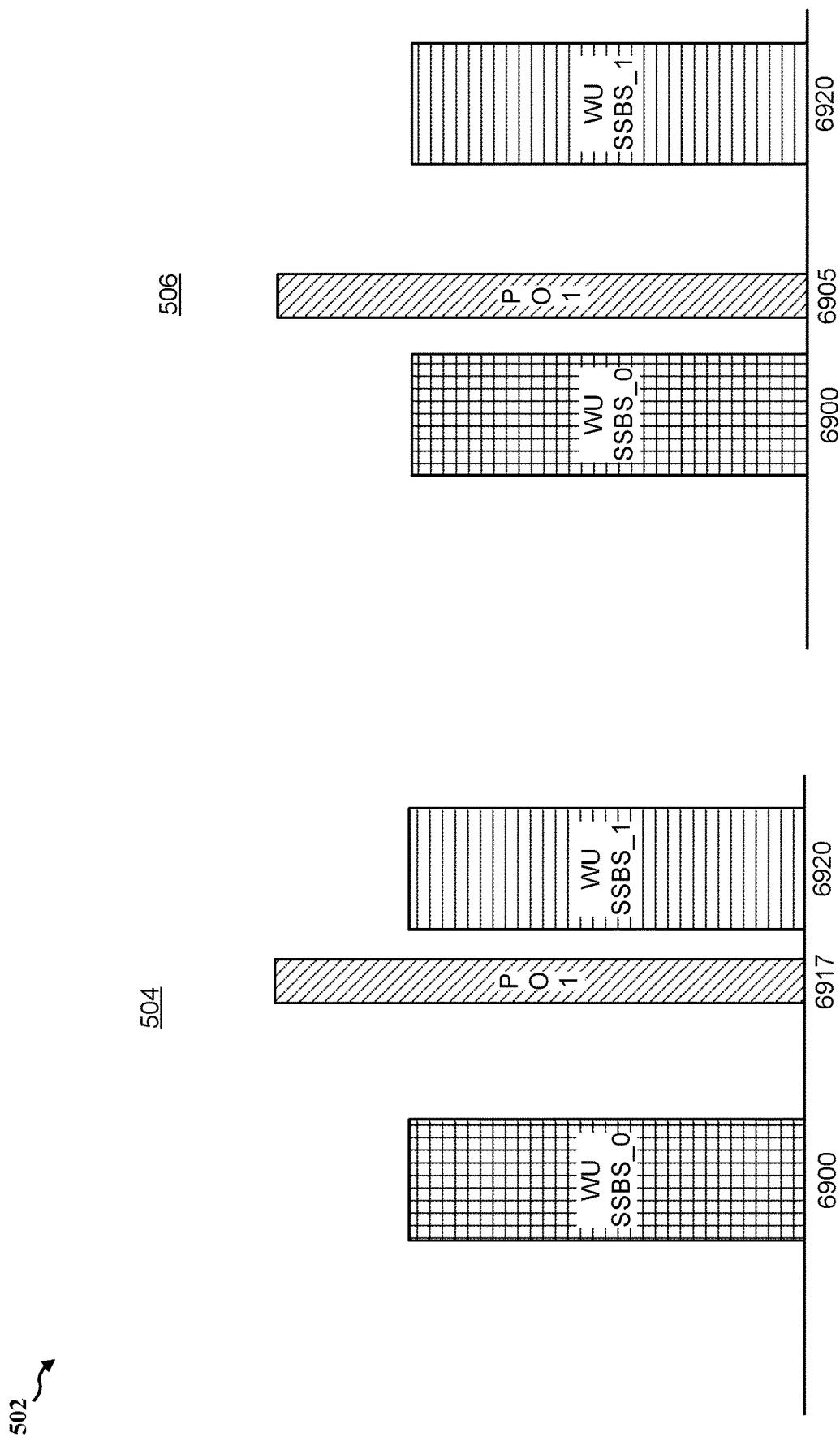
FIG. 5 illustrates example system frame number (SFN) positions and duration of the POs and SSBs.
Figure 6:
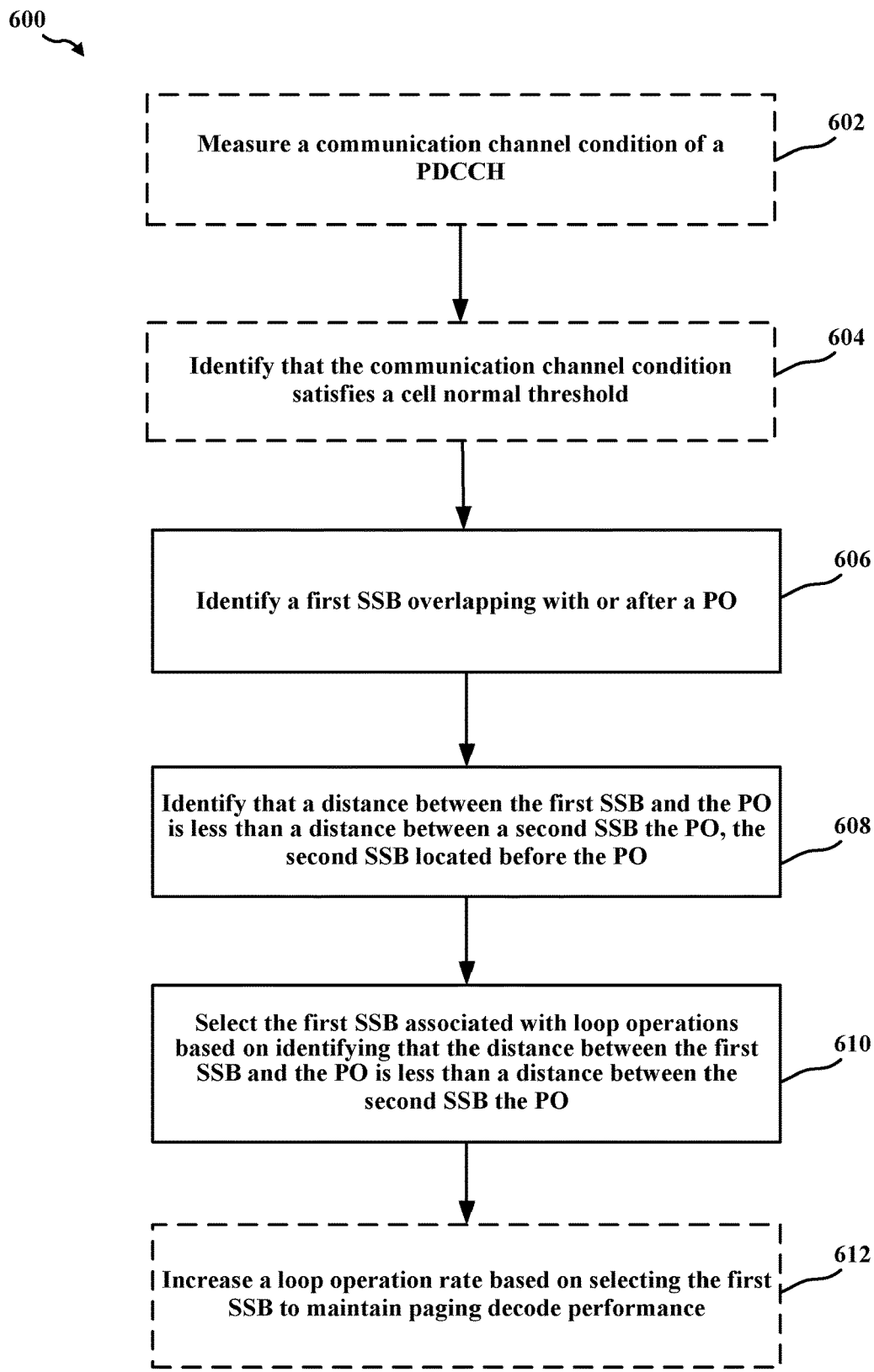
FIG. 6 is a flowchart of an example method of wireless communication at a UE that supports scheduling an SSB closer to a PO to reduce UE power consumption.

Turning now to FIGS. 2-7, aspects are depicted with reference to one or more components and one or more methods that may perform the actions or operations described herein, where aspects in dashed line may be optional. Although the operations described below in FIG. 6 are presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 1B:
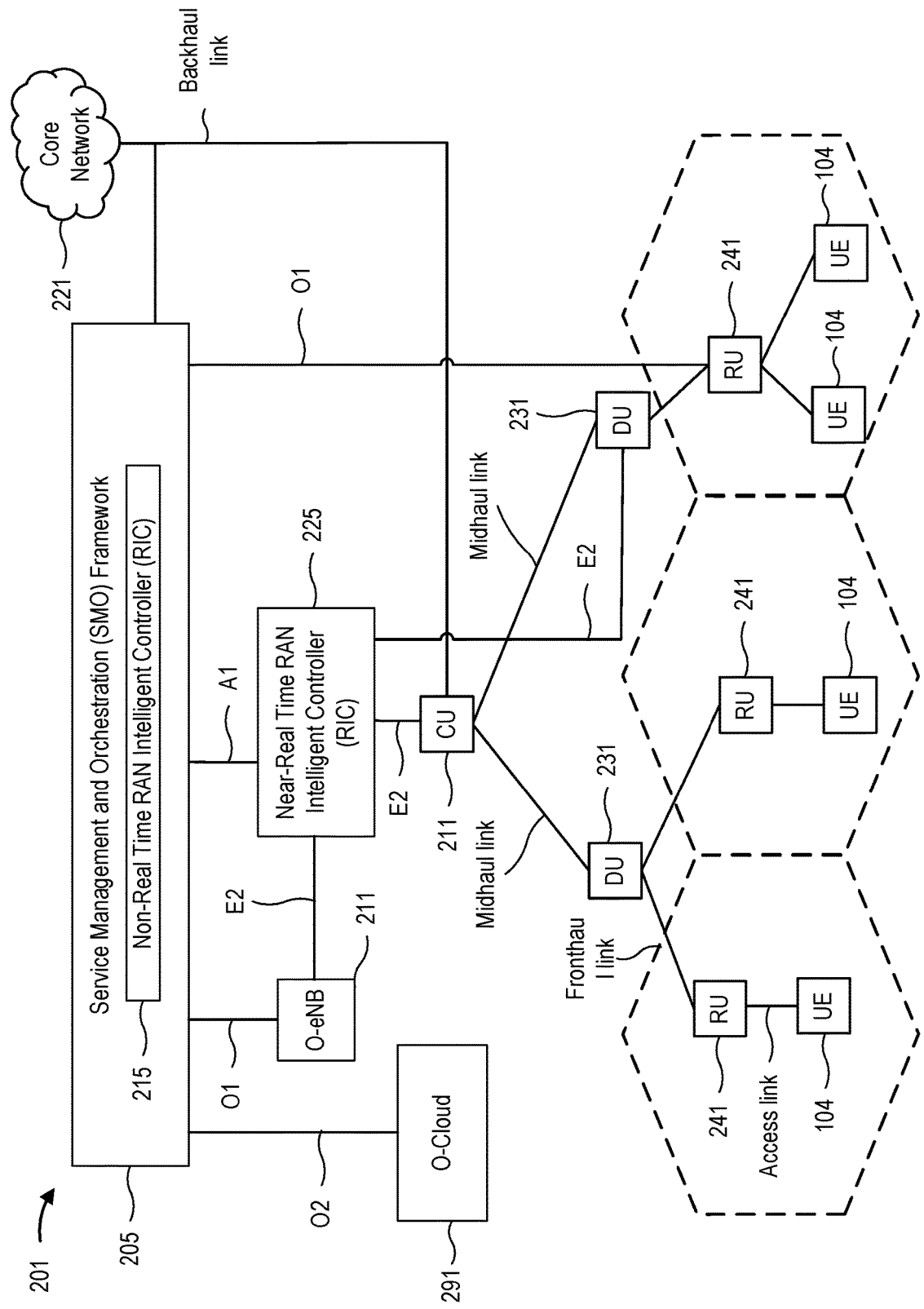
FIG. 1B is a diagram illustrating an example of disaggregated base station architecture.

FIG. 1B shows a diagram illustrating an example of disaggregated base station 201 architecture, any one or combination of elements of which may be one example implementation of base station 102 and/or base station 180

(see FIG. 1A) or, more generally, a network device. The disaggregated base station 201 architecture may include one or more central units (CUs) 211 that can communicate directly with a core network 221 via a backhaul link, or indirectly with the core network 221 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 211 may communicate with one or more distributed units (DUs) 231 via respective midhaul links, such as an F1 interface. The DUs 231 may communicate with one or more radio units (RUs) 241 via respective fronthaul links. The RUs 241 may communicate with respective UEs 104 via one or more radio frequency (RF) access links. In some implementations, the UE 104 may be simultaneously served by multiple RUs 241.

Each of the units, e.g., the CUs 211, the DUs 231, the RUs 241, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 211 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211. The CU 211 may be configured to handle user plane functionality (e.g., Central Unit-User Plane (CU-UP)), control plane functionality (e.g., Central Unit-Control Plane (CU-CP)), or a combination thereof. In some implementations, the CU 211 can be logically split into one or more CU-UP units and one or more CU-CP units. The CU-UP unit can communicate bidirectionally with the CU-CP unit via an interface, such as the E1 interface when implemented in an O-RAN configuration. The CU 211 can be implemented to communicate with the DU 231, as necessary, for network control and signaling.

The DU 231 may correspond to a logical unit that includes one or more base station functions to control the operation of one or more RUs 241. In some aspects, the DU 231 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 231 may further host one or more low PHY layers. Each layer (or module) can be implemented with an interface configured to communicate signals with other layers (and modules) hosted by the DU 231, or with the control functions hosted by the CU 211.

Lower-layer functionality can be implemented by one or more RUs 241. In some deployments, an RU 241, controlled by a DU 231, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241 can be implemented to handle over the air (OTA) communication with one or more UEs 104. In some implementations, real-time and non-real-time aspects of control and user plane communication with the RU(s) 241 can be controlled by the corresponding DU 231. In some scenarios, this configuration can enable the DU(s) 231 and the CU 211 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements can include, but are not limited to, CUs 211, DUs 231, RUs 241 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 241 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 211, one or more DUs 231, or both, as well as an O-eNB, with the Near-RT MC 225.

In some implementations, to generate AI/ML models to be deployed in the Near-RT MC 225, the Non-RT MC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 2:
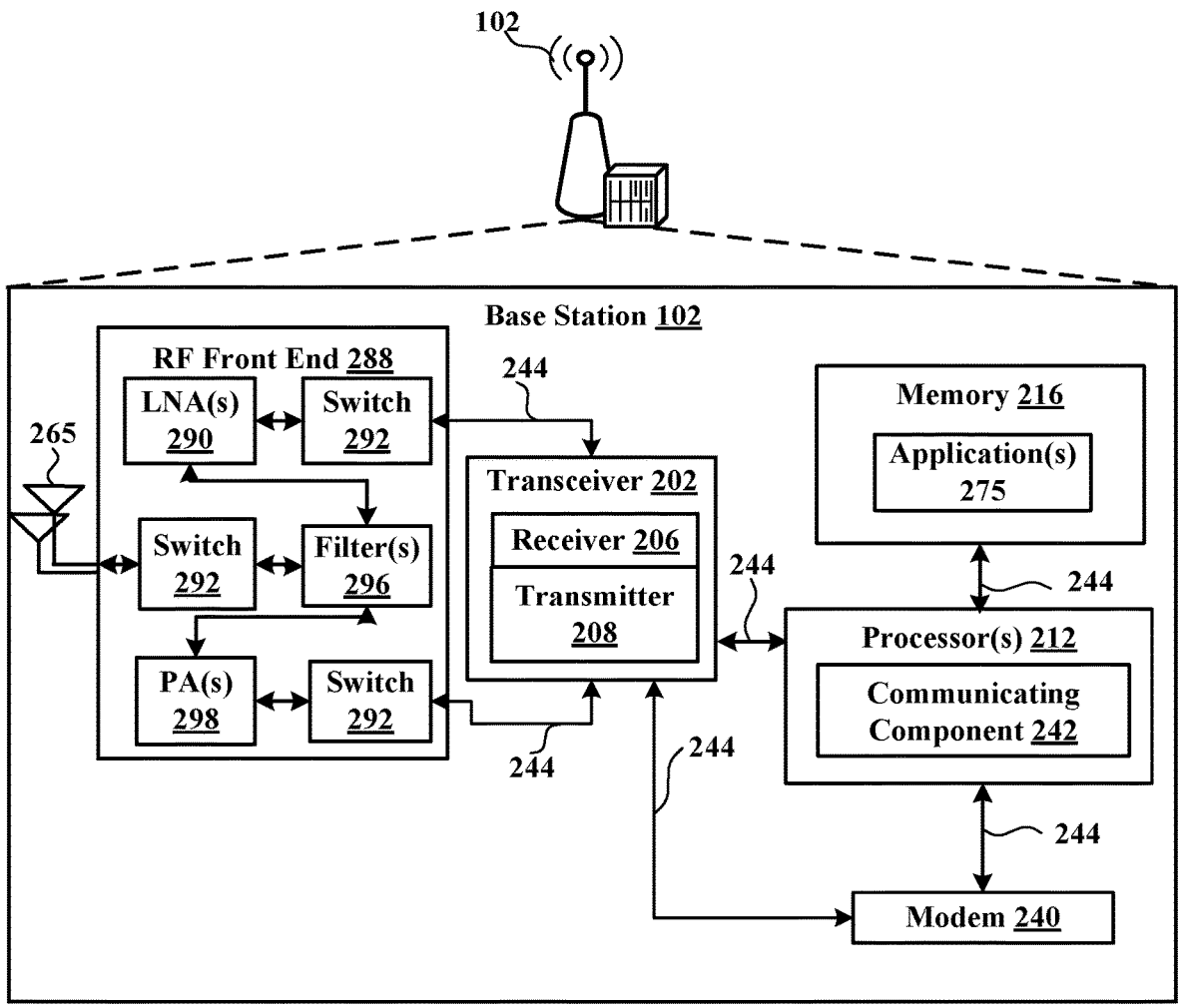
FIG. 2 is a block diagram illustrating an example of a network entity.

FIG. 2 is a block diagram illustrating an example of a network entity (also referred to as a base station (BS) that may have multiple TRPs). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for facilitating communications.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
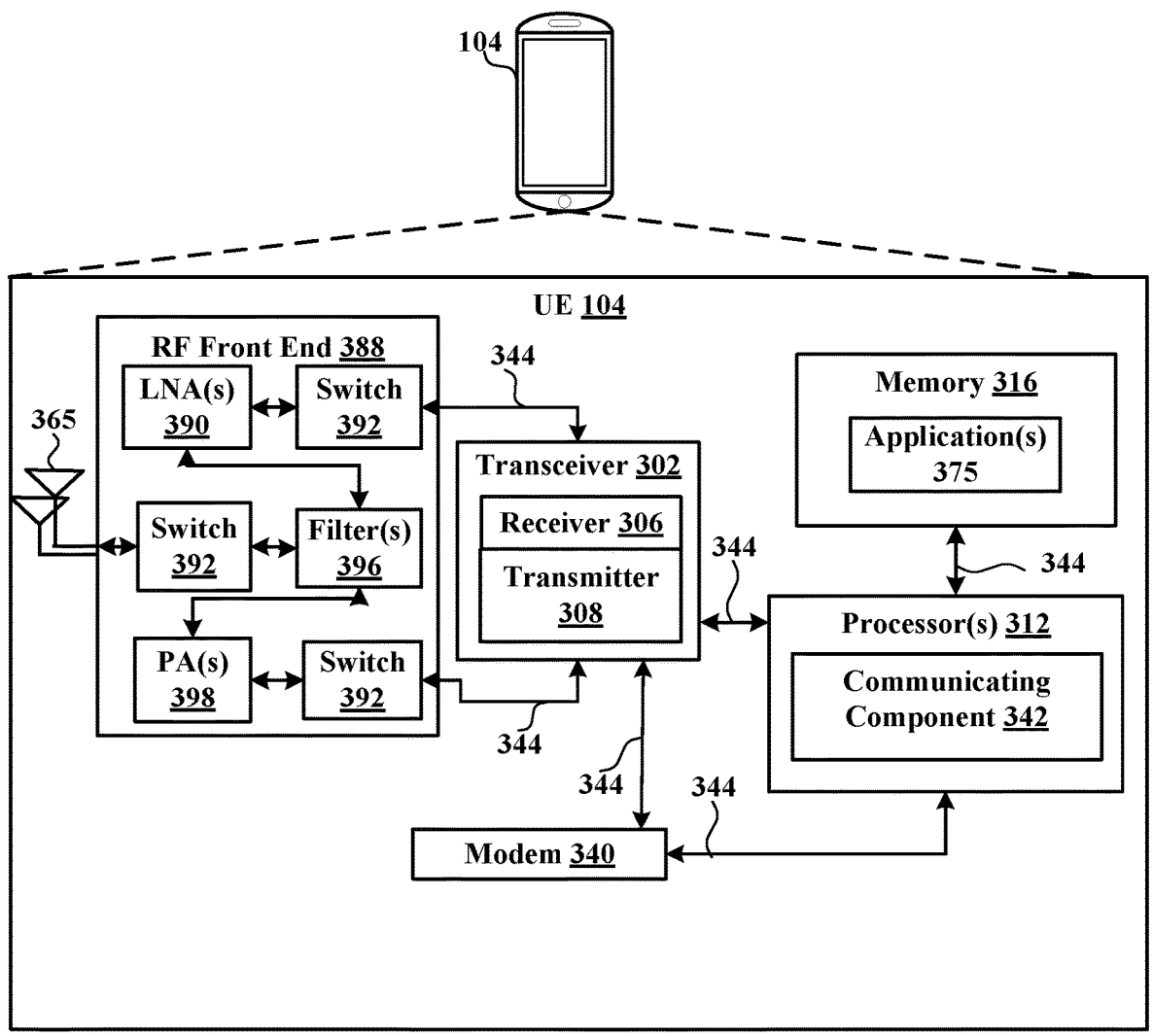
FIG. 3 is a block diagram illustrating an example of a user equipment (UE).

FIG. 3 is a block diagram illustrating an example of a user equipment (UE) 104. The UE 104 may include a variety of components, some of which have already been described above and are described further herein, including components such as one or more processors 312 and memory 316 and transceiver 302 in communication via one or more buses 344, which may operate in conjunction with modem 340 and communicating component 342 configured for identifying that a distance between the first SSB and the PO is less than a distance between a second SSB the PO, the second SSB located before the PO, and selecting the first SSB associated with loop operations based on identifying that the distance between the first SSB and the PO is less than a distance between the second SSB the PO.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

FIG. 4A illustrates an example paging communication scenario 400 including one or more POs and SSBs scheduled prior to the POs. For example, the first PO 404 (PO1) may be scheduled at SFN=X and the first set of SSBs 404 (warmup (WU)SSBS_1) may be scheduled 20 ms before the first PO1 404. Warmup SSBs 402 (WU SSBS) may be scheduled for search, measurement, or loop procedures before the first PO 404. Prior to performing paging during the first PO 404, and after receiving the first set of SSBs 404, a 20 ms wakeup duration may increase power consumption at the UE. A loop procedure may be scheduled every alternate DRX cycle in cell excellent mode, which may be indicative of a signal-to-noise ratio (SNR) satisfying a communication threshold (i.e., above an SNR level). A second PO 406 may be scheduled at the end of the DRX cycle, which may be 640 ms.

FIG. 4B illustrates another example paging communication scenario 420 including one or more POs and SSBs overlapping with or scheduled after the POs. The example paging communication scenario 420 demonstrates selection techniques of a second set of SSBs 426 (WU_SSBS_1) over a first set of SSBs 422 (WU_SSBS_0) associated with a first PO 424 (PO1). Specifically, a first distance 430 (A) may correspond to a distance in milliseconds between the first set of SSBs 422 (WU_SSBS_0) and a starting SFN of the first PO 424 (PO1). The second distance 432 (B) may correspond to a distance in milliseconds between the first set of SSBs 422 (WU_SSBS_0) after the first PO 424 (PO1), and an ending SFN of the first PO 424 (PO1). The ending SFN of the first PO 424 (PO1) may equal a starting SFN of the first PO 424 (PO1) in addition to or plus a duration of the first PO 424 (PO1) (i.e. 2 slots).

The present implementations may reduce power consumption during cell excellent or cell normal mode where an SNR value satisfies an SNR threshold value. UE may select WU SSBs closest to the paging SFN, overlapping, or on top of paging SFN based on the techniques described herein. If after the WU SSBs are selected on top of/overlapping the PO or after PO, then the loop procedure may be scheduled more frequently. To verify a final location of the optimized WU SSBS, the present implementations may proactively determine whether the UE wakeup timeline is increased after corresponding increasing (i.e., doubling) the loop rate. For example, Table 1 demonstrates loop procedures and intra-measurements for various DRX cycles without performing SSB selections according to the present implementations. In contrast, Table 2 demonstrates loop procedures and intra-measurements for various DRX cycles based on performing SSB selections according to the present implementations.

TABLE 1

Loop/measurements without SSB selection

| DRX Cycles (ms) | Excellent Mode | | |
|---|---|---|---|
| | Intra-search | Intra-Meas | Loops |
| 320 | 48 | 8 | 8 |
| 640 | 24 | 4 | 4 |
| 1280 | 24 | 2 | 2 |
| 2560 | 24 | 1 | 1 |

TABLE 2

Loop/measurements with SSB selection

| DRX Cycles (ms) | Excellent Mode | | |
|---|---|---|---|
| | Intra-search | Intra-Meas | Loops |
| 320 | 48 | 6 | 6 |
| 640 | 24 | 3 | 3 |
| 1280 | 24 | 2 | 1 |
| 2560 | 24 | 1 | 1 |

An example technique of the present implementations may optimize SSB selection based on identifying that a distance of warmup SSBs after a PO is lesser than warmup SSBs before the same PO (i.e., B<A), resulting in a reduced total power consumption after increasing (i.e., doubling) the loop rate.

In some aspects, a second distance 432 (B) may correspond to a distance in milliseconds between a second set of SSBs 426 selected after the first PO 424 and a an ending SFN of the PO 424, i.e., where the ending SFN of the PO 424 is equal to a starting SFN of the PO 424 plus the duration PO 424. In another aspect, a second distance 432 (B) may correspond to a product of a second set of SSBs 426 SFN selected after the PO 424 page ending SFN and a downsampling factor to consider if loop rate is increased after scheduling on top of PO 424 or after PO 424 SFN. In a further aspect, a second set of SSBs 426 SFN selected after page minus the PO 424 end SFN may be multiplied by a previous loop periodicity and divided by a new loop periodicity after applying the present techniques to determine a second distance 432 (B).

In some aspects, a first distance 430 (A) may correspond to a distance in milliseconds between a first set of SSBs 422 selected before the PO 424 and PO 424 start SFN. In another aspect, the first distance 430 (A) may correspond to a PO 424 start SFN minus the first set of SSBs 422 selected before the PO 424. If the UE is operating in a cell excellent/normal mode and a distance between the second set of SSBs 426 selected after PO 424 from the PO 424 ending SFN (B) after accounting for the loop doubling rate is less than distance between the first set of SSBs 422 selected before PO 424 and PO 424 starting SFN (A), the UE may schedule second set of SSBs 426 (WU_SSBS_1) on top of PO 424 or after PO 424. The UE may also double the loop tracking rate to maintain performance. Otherwise, the UE may schedule using the first set of SSBs 422.

FIG. 5 illustrates example communication scenarios 502 showing SFN positions and durations of the POs and SSBs. In a first implementation 504, a first set of WU SSBs (WU_SSBS_1) at 6920 may be selected to perform a loop warmup, where the loop rate may also be doubled to maintain paging decode performance. That is, as the starting SFN 6920 of the first set of WU SSBs is closer to the SFN 6917 of the first PO (PO1) than an SFN 6900 of a second set of WU SSBs, the UE may select the WU SSBs that are closer to perform the loop procedures and increase the loop rate. After doubling the loop rate, selecting WU_SSBS_1 may also reduce the UE wake period.

Conversely, in a second implementation, the second set of WU SSBs (WU_SSBS_0) at 6900 may be selected to perform the loop warmup. That is, as the ending SFN 6900 of a second set of WU SSBs is closer to the starting SFN of the first PO (PO1) than the starting SFN 6920 of the first set of WU SSBs to the SFN 6917 of PO1, the UE may select the WU SSBs that are closer to perform the loop procedures and increase the loop rate. As the second set of WU SSBs (WU_SSBS_0) is before the first PO (PO1), the loop rate may not be doubled to match paging decode performance.

FIG. 6 is a flowchart of another example method 600 for wireless communication at an apparatus of a UE. In an example, a UE, such as the UE 104 depicted and described in FIGS. 1, 3, and 7, or components thereof, can perform the functions described in method 600.

At block 602, the method 600 may measure a communication channel condition of a PDCCH. In some aspects, the communicating component 242, such as in conjunction with processor(s) 212, memory 216, or transceiver 202, may be configured to measure a communication channel condition of a PDCCH. Thus, the base station 102, the processor(s) 212, the communicating component 242 or one of its subcomponents may define the means for measuring a communication channel condition of a PDCCH.

At block 604, the method 600 may identify that the communication channel condition satisfies a cell normal threshold. In some aspects, the communicating component 242, such as in conjunction with processor(s) 212, memory 216, or transceiver 202, may be configured to identify that the communication channel condition satisfies a cell normal threshold. Thus, the base station 102, the processor(s) 212, the communicating component 242 or one of its subcomponents may define the means for identifying that the communication channel condition satisfies a cell normal threshold.

At block 606, the method 600 may identify a first SSB overlapping with or after a PO. In some aspects, the communicating component 242, such as in conjunction with processor(s) 212, memory 216, or transceiver 202, may be configured to identify a first SSB overlapping with or after a PO. Thus, the base station 102, the processor(s) 212, the communicating component 242 or one of its subcomponents may define the means for identifying a first SSB overlapping with or after a PO.

At block 608, the method 600 may identify that a distance between the first SSB and the PO is less than a distance between a second SSB the PO, the second SSB located before the PO. In some aspects, the communicating component 242, such as in conjunction with processor(s) 212, memory 216, or transceiver 202, may be configured to identify that a distance between the first SSB and the PO is less than a distance between a second SSB the PO, the second SSB located before the PO. Thus, the base station 102, the processor(s) 212, the communicating component 242 or one of its subcomponents may define the means for identifying that a distance between the first SSB and the PO is less than a distance between a second SSB the PO, the second SSB located before the PO.

In some aspects, the first SSB overlapping with or after the PO may be identified in response to identifying that the communication channel condition satisfies the cell normal threshold.

In some aspects, the communication channel condition corresponds to a signal-to-noise (SNR) measurement.

In some aspects, the distance between the first SSB and the PO may correspond to a duration value associated with a PO ending SFN and a first SSB ending SFN.

In some aspects, the distance between the first SSB and the PO may be further a function of a downsampling factor to identify an increase in a loop operation rate.

In some aspects, the distance between the second SSB and the PO may correspond to a duration value associated with a PO starting SFN and a second SSB starting SFN.

In some aspects, a SFN of the first SSB is greater than an SFN of the second SSB.

At block 610, the method 600 may select the first SSB associated with loop operations based on identifying that the distance between the first SSB and the PO is less than a distance between the second SSB the PO. In some aspects, the communicating component 242, such as in conjunction with processor(s) 212, memory 216, or transceiver 202, may be configured to select the first SSB associated with loop operations based on identifying that the distance between the first SSB and the PO is less than a distance between the second SSB the PO. Thus, the base station 102, the processor(s) 212, the communicating component 242 or one of its subcomponents may define the means for selecting the first SSB associated with loop operations based on identifying that the distance between the first SSB and the PO is less than a distance between the second SSB the PO.

At block 612, the method 600 may increase a loop operation rate based on selecting the first SSB to maintain paging decode performance. In some aspects, the communicating component 242, such as in conjunction with processor(s) 212, memory 216, or transceiver 202, may be configured to v. Thus, the base station 102, the processor(s) 212, the communicating component 242 or one of its subcomponents may define the means for increasing a loop operation rate based on selecting the first SSB to maintain paging decode performance.

In some aspects, the loop operation rate may be doubled.

In some aspects, the UE may be operating in a standalone mode.

In some aspects, the UE may include a single SSIM or a MSIM.

Figure 7:
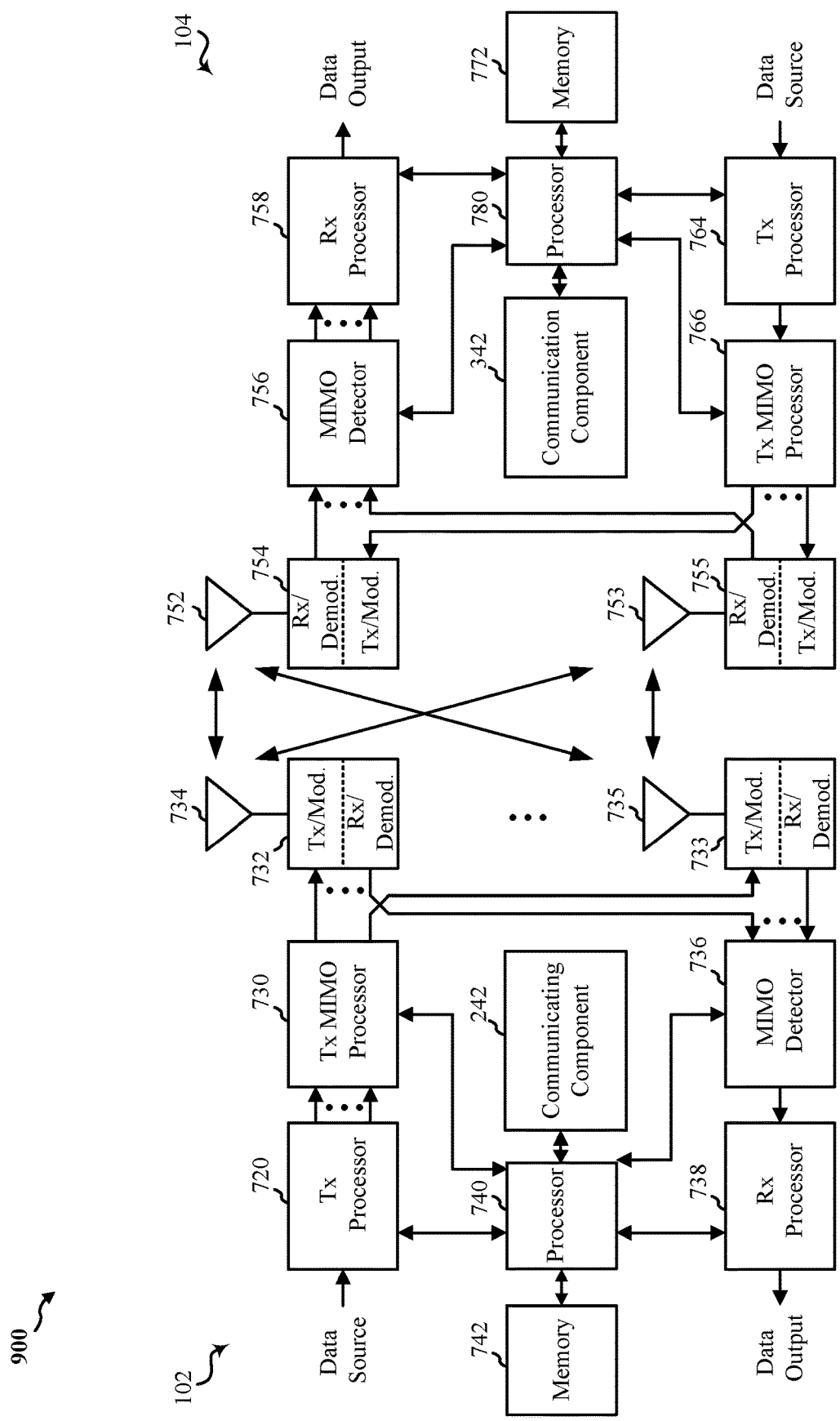
FIG. 7 is a block diagram illustrating an example of a MIMO communication system including a BS and a UE.

FIG. 7 is a block diagram of a MIMO communication system 700 including a base station 102 (such as the base station 102 depicted and described in FIGS. 1, 2 and 7) and a UE 104 (such as the UE 104 depicted and described in FIGS. 1, 3 and 7). The MIMO communication system 700 may be configured to enhance coverage for initial access procedure by providing co-located PCIs for beam-specific system information transmissions, described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (such as FIGS. 1 and 2). The processor 720 may in some cases execute stored instructions to instantiate a communicating component 342 (such as FIGS. 1 and 3).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

SOME ADDITIONAL EXAMPLES

The aspects described herein additionally include one or more of the following aspect examples described in the following numbered clauses.

1. A method of wireless communication at a user equipment (UE), comprising:
   identifying a first synchronization signal block (SSB) overlapping with or after a paging occasion (PO);
   identifying that a distance between the first SSB and the PO is less than a distance between a second SSB the PO, the second SSB located before the PO; and
   selecting the first SSB associated with loop operations based on identifying that the distance between the first SSB and the PO is less than a distance between the second SSB the PO.

2. The method of clause 1, further comprising increasing a loop operation rate based on selecting the first SSB to maintain paging decode performance.

3. The method of clause 2, wherein the loop operation rate is doubled.

4. The method of clause 1 to clause 3, further comprising:
   measuring a communication channel condition of a physical downlink control channel (PDCCH);
   identifying that the communication channel condition satisfies a cell normal threshold,
   wherein the first SSB overlapping with or after the PO is identified in response to identifying that the communication channel condition satisfies the cell normal threshold.

5. The method of clause 4, wherein the communication channel condition corresponds to a signal-to-noise (SNR) measurement.

6. The method of clause 1 to clause 5, wherein the distance between the first SSB and the PO corresponds to a duration value associated with a PO ending system frame number (SFN) and a first SSB ending SFN.

7. The method of clause 6, wherein the distance between the first SSB and the PO is further a function of a downsampling factor to identify an increase in a loop operation rate.

8. The method of clause 1 to clause 7, wherein the distance between the second SSB and the PO corresponds to a duration value associated with a PO starting system frame number (SFN) and a second SSB starting SFN.

9. The method of clause 1 to clause 8, wherein a system frame number (SFN) of the first SSB is greater than an SFN of the second SSB.

10. The method of clause 1 to clause 9, wherein the UE is operating in a standalone mode.

11. The method of clause 1 to clause 10, wherein the UE includes a single subscriber identity module (SSIM) or a multi-SIM (MSIM).

12. An apparatus for wireless communication, comprising:
a transceiver;
a memory configured to store instructions; and
at least one processor communicatively coupled with the transceiver and the memory, wherein the at least one processor is configured to:
identify a first synchronization signal block (SSB) overlapping with or after a paging occasion (PO);
identify that a distance between the first SSB and the PO is less than a distance between a second SSB the PO, the second SSB located before the PO; and
select the first SSB associated with loop operations based on identifying that the distance between the first SSB and the PO is less than a distance between the second SSB the PO.

13. The apparatus of clause 12, wherein the at least one processor is further configured to increase a loop operation rate based on selecting the first SSB to maintain paging decode performance.

14. The apparatus of clause 13, wherein the loop operation rate is doubled.

15. The apparatus of clause 12 to clause 14, wherein the at least one processor is further configured to:
measure a communication channel condition of a physical downlink control channel (PDCCH);
identify that the communication channel condition satisfies a cell normal threshold,
wherein the first SSB overlapping with or after the PO is identified in response to identifying that the communication channel condition satisfies the cell normal threshold.

16. The apparatus of clause 15, wherein the communication channel condition corresponds to a signal-to-noise (SNR) measurement.

17. The apparatus of clause 12 to clause 16, wherein the distance between the first SSB and the PO corresponds to a duration value associated with a PO ending system frame number (SFN) and a first SSB ending SFN.

18. The apparatus of clause 17, wherein the distance between the first SSB and the PO is further a function of a downsampling factor to identify an increase in a loop operation rate.

19. The apparatus of clause 12 to clause 18, wherein the distance between the second SSB and the PO corresponds to a duration value associated with a PO starting system frame number (SFN) and a second SSB starting SFN.

20. The apparatus of clause 12 to clause 19, wherein a system frame number (SFN) of the first SSB is greater than an SFN of the second SSB.

21. The apparatus of clause 12 to clause 20, wherein the UE is operating in a standalone mode.

22. The apparatus of clause 12 to clause 21, wherein the UE includes a single subscriber identity module (SSIM) or a multi-SIM (MSIM).

23. A non-transitory computer-readable medium, comprising including code executable by at least one processor to:
identify a first synchronization signal block (SSB) overlapping with or after a paging occasion (PO);
identify that a distance between the first SSB and the PO is less than a distance between a second SSB the PO, the second SSB located before the PO; and
select the first SSB associated with loop operations based on identifying that the distance between the first SSB and the PO is less than a distance between the second SSB the PO.

24. The non-transitory computer-readable medium of clause 23, wherein the at least one processor is further configured to increase a loop operation rate based on selecting the first SSB to maintain paging decode performance.

25. The non-transitory computer-readable medium of clause 24, wherein the loop operation rate is doubled.

26. The non-transitory computer-readable medium of clause 23 to clause 25, wherein the distance between the first SSB and the PO corresponds to a duration value associated with a PO ending system frame number (SFN) and a first SSB ending SFN.

27. The non-transitory computer-readable medium of clause 23 to clause 26, wherein the distance between the first SSB and the PO is further a function of a downsampling factor to identify an increase in a loop operation rate.

28. The non-transitory computer-readable medium of clause 23 to clause 27, wherein the distance between the second SSB and the PO corresponds to a duration value associated with a PO starting system frame number (SFN) and a second SSB starting SFN.

29. The non-transitory computer-readable medium of clause 23 to clause 28, wherein a system frame number (SFN) of the first SSB is greater than an SFN of the second SSB.

30. An apparatus for wireless communication, comprising:
means for identifying a first synchronization signal block (SSB) overlapping with or after a paging occasion (PO);
means for identifying that a distance between the first SSB and the PO is less than a distance between a second SSB the PO, the second SSB located before the PO; and
means for selecting the first SSB associated with loop operations based on identifying that the distance between the first SSB and the PO is less than a distance between the second SSB the PO.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single implementation. Conversely, various features that are described in the context of a single implementation also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication at a user equipment (UE), comprising:
   identifying a first synchronization signal block (SSB) overlapping with or after a paging occasion (PO);
   identifying that a distance between the first SSB and the PO is less than a distance between a second SSB and the PO, the second SSB located before the PO;
   selecting the first SSB associated with loop operations based on identifying that the distance between the first SSB and the PO is less than a distance between the second SSB the PO; and
   increasing a loop operation rate based on selecting the first SSB to maintain paging decode performance.

2. The method of claim 1, wherein the loop operation rate is doubled.

3. The method of claim 1, further comprising:
   measuring a communication channel condition of a physical downlink control channel (PDCCH);
   identifying that the communication channel condition satisfies a cell normal threshold,
   wherein the first SSB overlapping with or after the PO is identified in response to identifying that the communication channel condition satisfies the cell normal threshold.

4. The method of claim 3, wherein the communication channel condition corresponds to a signal-to-noise (SNR) measurement.

5. The method of claim 1, wherein the distance between the first SSB and the PO corresponds to a duration value associated with a PO ending system frame number (SFN) and a first SSB ending SFN.

6. The method of claim 5, wherein the distance between the first SSB and the PO is further a function of a down-sampling factor to identify an increase in a loop operation rate.

7. The method of claim 1, wherein the distance between the second SSB and the PO corresponds to a duration value associated with a PO starting system frame number (SFN) and a second SSB starting SFN.

8. The method of claim 1, wherein a system frame number (SFN) of the first SSB is greater than an SFN of the second SSB.

9. The method of claim 1, wherein the UE is operating in a standalone mode.

10. The method of claim 1, wherein the UE includes a single subscriber identity module (SSIM) or a multi-SIM (MSIM).

11. An apparatus for wireless communication, comprising:
- a transceiver;
- a memory configured to store instructions; and
- at least one processor communicatively coupled with the transceiver and the memory, wherein the at least one processor is configured to:
  - identify a first synchronization signal block (SSB) overlapping with or after a paging occasion (PO);
  - identify that a distance between the first SSB and the PO is less than a distance between a second SSB and the PO, the second SSB located before the PO;
  - select the first SSB associated with loop operations based on identifying that the distance between the first SSB and the PO is less than a distance between the second SSB the PO; and
  - increase a loop operation rate based on selecting the first SSB to maintain paging decode performance.

12. The apparatus of claim 11, wherein the loop operation rate is doubled.

13. The apparatus of claim 11, wherein the at least one processor is further configured to:
- measure a communication channel condition of a physical downlink control channel (PDCCH);
- identify that the communication channel condition satisfies a cell normal threshold,
- wherein the first SSB overlapping with or after the PO is identified in response to identifying that the communication channel condition satisfies the cell normal threshold.

14. The apparatus of claim 13, wherein the communication channel condition corresponds to a signal-to-noise (SNR) measurement.

15. The apparatus of claim 11, wherein the distance between the first SSB and the PO corresponds to a duration value associated with a PO ending system frame number (SFN) and a first SSB ending SFN.

16. The apparatus of claim 15, wherein the distance between the first SSB and the PO is further a function of a downsampling factor to identify an increase in a loop operation rate.

17. The apparatus of claim 11, wherein the distance between the second SSB and the PO corresponds to a duration value associated with a PO starting system frame number (SFN) and a second SSB starting SFN.

18. The apparatus of claim 11, wherein a system frame number (SFN) of the first SSB is greater than an SFN of the second SSB.

19. The apparatus of claim 11, wherein the UE is operating in a standalone mode.

20. The apparatus of claim 11, wherein the UE includes a single subscriber identity module (SSIM) or a multi-SIM (MSIM).

21. A non-transitory computer-readable medium, comprising including code executable by at least one processor to:
- identify a first synchronization signal block (SSB) overlapping with or after a paging occasion (PO);
- identify that a distance between the first SSB and the PO is less than a distance between a second SSB and the PO, the second SSB located before the PO;
- select the first SSB associated with loop operations based on identifying that the distance between the first SSB and the PO is less than a distance between the second SSB the PO; and
- increase a loop operation rate based on selecting the first SSB to maintain paging decode performance.

22. The non-transitory computer-readable medium of claim 21, wherein the loop operation rate is doubled.

23. The non-transitory computer-readable medium of claim 21, wherein the distance between the first SSB and the PO corresponds to a duration value associated with a PO ending system frame number (SFN) and a first SSB ending SFN.

24. The non-transitory computer-readable medium of claim 21, wherein the distance between the first SSB and the PO is further a function of a downsampling factor to identify an increase in a loop operation rate.

25. The non-transitory computer-readable medium of claim 21, wherein the distance between the second SSB and the PO corresponds to a duration value associated with a PO starting system frame number (SFN) and a second SSB starting SFN.

26. The non-transitory computer-readable medium of claim 21, wherein a system frame number (SFN) of the first SSB is greater than an SFN of the second SSB.

27. An apparatus for wireless communication, comprising:
- means for identifying a first synchronization signal block (SSB) overlapping with or after a paging occasion (PO);
- means for identifying that a distance between the first SSB and the PO is less than a distance between a second SSB and the PO, the second SSB located before the PO;
- means for selecting the first SSB associated with loop operations based on identifying that the distance between the first SSB and the PO is less than a distance between the second SSB the PO; and
- means for increasing a loop operation rate based on selecting the first SSB to maintain paging decode performance.

* * * * *